US006845132B2

United States Patent
(12) United States Patent
Dyer

(10) Patent No.: US 6,845,132 B2
(45) Date of Patent: Jan. 18, 2005

(54) EFFICIENT, DYNAMICALLY ADAPTIVE BIAS ARCHITECTURE AND ASSOCIATED METHODS

(75) Inventor: Kenneth C. Dyer, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 09/858,226

(22) Filed: May 15, 2001

(65) Prior Publication Data

US 2002/0172295 A1 Nov. 21, 2002

(51) Int. Cl.[7] .......... H04L 27/04

(52) U.S. Cl. .......... 375/295; 375/219; 375/287; 375/297; 327/307

(58) Field of Search .......... 375/295, 297, 375/219, 287; 327/307; 330/285, 297

(56) References Cited

U.S. PATENT DOCUMENTS 5,130,635 A * 7/1992 Kase .......... 323/280
5,852,630 A * 12/1998 Langberg et al. .......... 375/219
6,038,266 A 3/2000 Lee et al.
6,188,721 B1 2/2001 Shirani et al.
6,211,716 B1 * 4/2001 Nguyen et al. .......... 327/307
6,600,483 B1 * 7/2003 Akita et al. .......... 345/204

FOREIGN PATENT DOCUMENTS

EP 0 611 059 A2 8/1994
EP 0 938 215 A2 8/1999

* cited by examiner

*Primary Examiner*—Shuwang Liu
(74) *Attorney, Agent, or Firm*—Blakely, Sokoloff, Taylor & Zafman LLP

(57) ABSTRACT

An adaptive bias module architecture and related methods is presented. According to one embodiment, for example, a method is presented comprising detecting a power level associated with data received by a transmit driver for transmission into an inductive load without analyzing the data content, and adapting a bias level applied to the transmit driver to facilitate transmission of the received data based, at least in part, on the detected power level.

10 Claims, 4 Drawing Sheets

302
From other detectors
402
416
$I_{REF}$
408
418
424
A
414
422
B
Gm
$I_{COMM}$
306
310
412
420
nbiasp
THRESHOLD DETECTOR
426
428
404
406
sensitivity
pair
Control
BIAS
304
enable
430
416
$I_{REF}$
$I_{BIAS}$

EFFICIENT, DYNAMICALLY ADAPTIVE BIAS ARCHITECTURE AND ASSOCIATED METHODS

TECHNICAL FIELD

This invention generally relates to data communications and, more particularly, to an efficient, dynamically adaptive bias architecture and associated methods suitable for use in network transceivers.

BACKGROUND

Networking interface devices, e.g., routers, switches, network interface cards, etc. that facilitate transmission of data over a data communications network typically utilize a bias circuit, coupled to a line driver, to supply necessary power to facilitate transmission of data over the transmission line. An example of a conventional network device utilizing a static bias module is presented below, with reference to FIG. 1.

FIG. 1 is a block diagram of a conventional network interface device including a statically biased transmit module. In accordance with the illustrated example implementation, network interface device 100 couples a computing system (not shown) to network (not shown). The network interface device 100 is depicted comprising control logic 102, a receive module 104, a transmit module 106, memory 114 and one or more applications 116. As introduced above, transmit module 106 is intended to represent any of a number of transmitters which, in addition to conventional modulation, error correction and other processing attributes, includes a static bias module 108, coupled to a line driver 110, which is coupled to a network transmission line via an isolation transformer 112. As illustrated, a transmit module 106 may well include multiple bias module 108—line driver 110 pairs.

As introduced above, conventional network interface devices are typically designed with conventional static bias circuits, which are specified to accommodate a worst-case transmission requirement, and provide bias power to the line driver to facilitate such a worst-case transmission requirement even if that worst case transmission scenario only occasionally develops. An example of just such a worst-case transmission event is the baseline wander (BLW) high-power event.

Those skilled in the art will appreciate that a baseline wander high-power event occurs when transmitting a large number of consecutive ones (1) or zeroes (0) to the transmission line. When such a baseline wander event occurs, a DC offset is introduced into the transmitted signal, requiring additional power from the line driver 108. An example of a baseline wander event is illustrated with reference to FIG. 2, below.

FIG. 2 is a graphical illustration depicting introduction of a DC bias in a transmitted signal characteristic of a high-power event. As shown, FIG. 2 illustrates a data pattern 202 received for transmission. As depicted here, each logic high and/or low is intended to represent a number of 1's, or 0's, respectively. The illustrated pattern 204 depicts how the data pattern 202 is skewed with a DC offset after a long run of consecutive 1's or 0's. More particularly, with reference to numeral 206, a DC offset is denoted as the deviation of the signal from the dashed line.

Insofar as such high-power events, such as the illustrated baseline wander event 206 occur only occasionally, conventional bias modules effectively waste power by continuously supplying a heightened power level designed to support transmission through such a worst case condition.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION

The present invention is generally drawn to an adaptive bias module and related methods which, when implemented in a transmission device, reduces the power consumption of the transmission device. According to one example implementation of the present invention, introduced more fully below, an innovative adaptive bias module incorporating the teachings of the present invention is introduced in a 100 base-T network interface device as a means of efficiently controlling the transmit driver of the network interface device. Although introduced in the context of such an example implementation, however, those skilled in the art will appreciate that the teachings of the present invention may readily be applied to any of a number of alternative implementations that require transmission into an inductive load such as, for example, wireless transmission applications, and the like.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Adaptive Transmit Module

Figure 1:
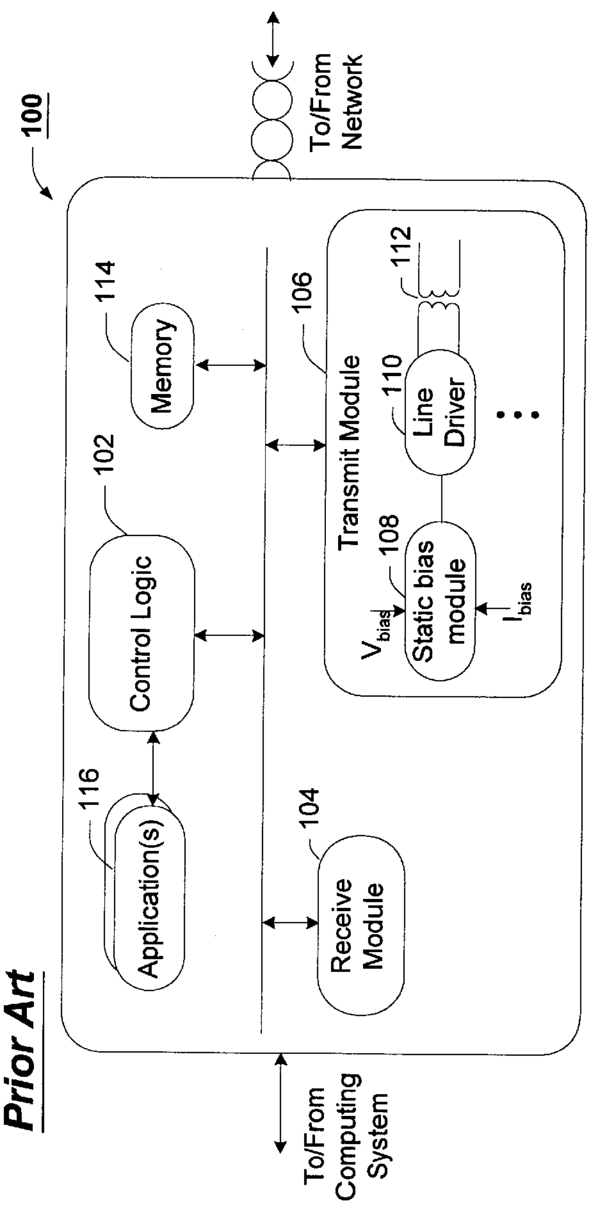
FIG. 1 is a block diagram of a conventional network interface device including a statically biased transmit module.
Figure 2:
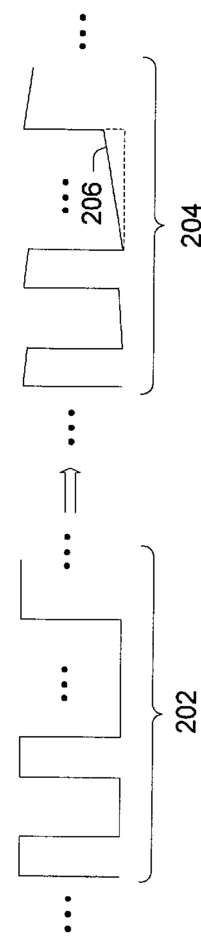
FIG. 2 is a graphical illustration depicting introduction of a DC bias in a transmitted signal characteristic of a high-power event.
Figure 3:
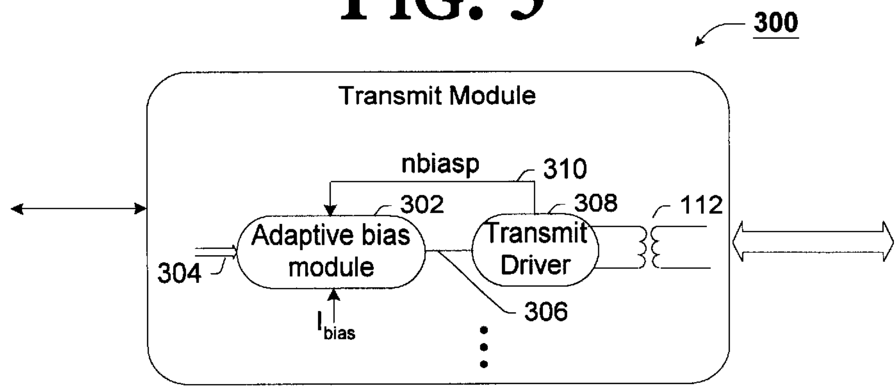
FIG. 3 is a block diagram of an example transmit module incorporating a dynamically adaptive bias module, in accordance with the teachings of the present invention.

FIG. 3 is a block diagram of an example transmit module 300 including a dynamically adaptive bias module 302 incorporating the teachings of the present invention, in accordance with an example embodiment of the present invention. In accordance with the illustrated example embodiment of FIG. 3, transmit module 300 is depicted comprising an adaptive bias module 302, coupled 306 to a transmit driver 308 (e.g., line driver 110), which is generally coupled to an inductive load, e.g., an antenna, a transmission line through a transformer (e.g., 112), etc. As with conventional bias modules (e.g., 106), adaptive bias module 302 receives an input voltage (Vbias) and/or current (Ibias) from which a bias level (e.g., common mode current (Icomm)) enabling the transmit driver 308 is generated. Unlike conventional, static bias modules (108) that delivered a constant bias power designed to meet the worst-case power requirements of the transmit module, adaptive bias module 302 dynamically adjusts the generated bias level based, at least in part, on the power requirements associated with the data to be transmitted. That is, as will be developed more fully below, adaptive bias module 302 senses the power requirements associated with the data to be transmitted and adjusts a bias power level delivered to the transmit driver 110 (e.g., via line 306) to facilitate the power demand. In this regard, by limiting delivery of a worst-case bias power level to only those limited situations in which it is required, the adaptive bias module 302 significantly reduces the power requirements associated with a transmit module utilizing the adaptive bias module 302.

For ease of illustration, and not limitation, adaptive bias module 302 is depicted coupled to an associated transmit driver 308. Those skilled in the art will appreciate that additional adaptive bias modules 302 may well be coupled to additional drivers 308 within transmit module 300, and/or that adaptive bias module 302 may well bias multiple transmit drivers 308 without deviating from the spirit and scope of the present invention. Similarly, although depicted as being co-located with the transmit driver 308, those skilled in the art will appreciate that adaptive bias module 302 may well provide bias power to remotely located transmit drivers 308 through line 306, i.e., the adaptive bias module 302 need not be integrated within transmit module 300 to be used by transmit module 300. In this regard, the block diagram of FIG. 3 is merely illustrative of the teachings of the present invention.

Figure 4:
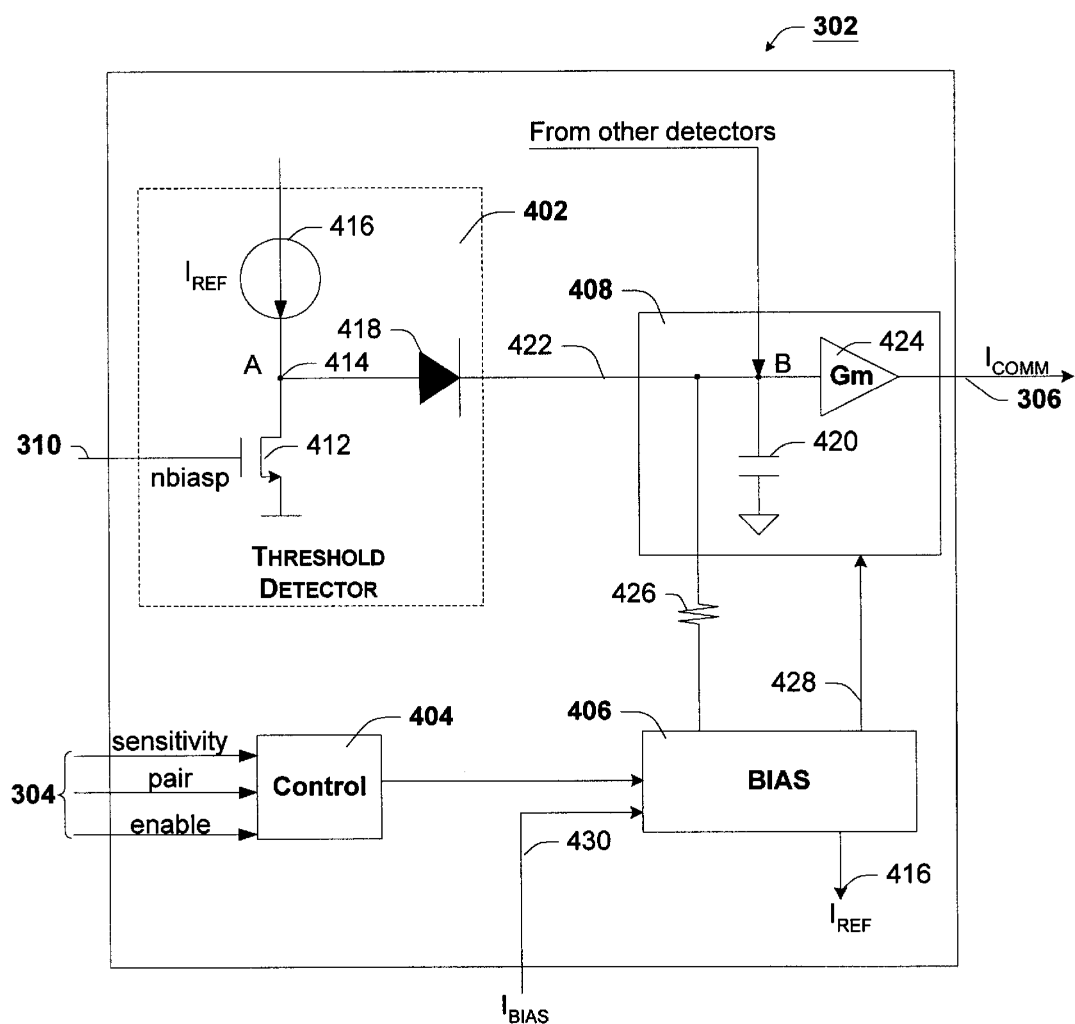
FIG. 4 is a schematic diagram of an example dynamically adaptive bias module, according to one example implementation of the present invention.

Turning to FIG. 4, a schematic diagram of an example dynamically adaptive bias module, according to one example implementation of the present invention. In accordance with the illustrated example embodiment of FIG. 4, adaptive bias module 302 is depicted comprising a threshold detector 402, a control module 404, a bias block 406 and a transconductance cell 408, each coupled as depicted. In general, the threshold detector 402 receives an indication of the power requirement associated with data received at the transmit driver via line 310. According to one embodiment, the received indication is a bias level (nbiasp), or an electrical potential corresponding to an average potential of the received data. That is, the bias level corresponds to a potential of the received data, but is not generated through an analysis of the received data.

In accordance with the illustrated example embodiment, once the indication (nbiasp) exceeds a threshold, defined in part by a reference current ($I_{REF}$), the threshold detector output 422 to the transconductance cell 408 is increased to increase the output power level 306 (e.g., common mode current $I_{COMM}$) of the bias module 302, temporarily providing the power necessary to support transmission of the received data. According to one example implementation, described more fully below, bias module 302 utilizes an envelope detector to detect when the power requirements of the transmit driver 308 exceed the threshold, and cause the threshold detector 402 to increase the power delivered to the transconductance cell 408, which in turn supplies more power to the transmit driver 308. In this regard, adaptive bias module 302 monitors the power requirements associated with the transmission of a particular data set without actually analyzing the data set itself.

In accordance with the illustrated example implementation, threshold detector 402 is depicted comprising a reference current source ($I_{REF}$) 416, a transistor driver 412, and a driver 418, each coupled as depicted. As will be developed more fully below, the elements of the threshold detector 402 detect when the transmit driver 308 is experiencing a high-power event, e.g., a baseline wander event, and supplements the power supplied to the transconductance cell 408 from bias block 406 via line 426. More particularly, once the current through the transistor driver 412 (e.g., a field effect transistor) drops below the reference current $I_{REF}$ 416, the diode 418, acting as a switch, is turned "on" and increases the voltage applied to point B (reference numeral 422) of the transconductance cell 408. As introduced above, the point at which the transistor driver 412 is starved of current depends on the bias level of, in this case, the field effect transistor nbiasp, taken from the core of the transmit driver. In accordance with the teachings of the present invention, nbiasp is an indication of the power requirements associated with transmitting a particular data set. Thus, nbiasp will move up or down to reflect the relative amplitude of the data to be sent. Those skilled in the art will appreciate from the schematic diagram of FIG. 4 that the point at which transistor driver 412 becomes starved of current is determined, at least in part, by the value of $I_{REF}$ 416, generated by bias block 406 under the control of control logic 404.

In accordance with the illustrated example implementation of FIG. 4, transconductance cell 408 receives a bias voltage from bias block 406 via line 428 which, as introduced above, is supplemented as necessary to support the transmission power requirements of a coupled transmit driver 308. In accordance with one example implementation, transconductance cell 408 is comprised of capacitor 420 and a transconductor 424, each coupled as depicted. Those skilled in the art will appreciate that the diode 418 of the threshold detector 402 and the capacitor 420 of the transconductance cell 408 serve as an envelope detector, regulating voltage to the transconductor 424. Those skilled in the art will appreciate that, as used herein, a transconductor 424 is a form of amplifier, wherein an input voltage is translated into an output current.

According to one example implementation, transconductor 424 is an internally terminated class A driver and should, therefore, have a constant output stage current, $I_{COMM}$. Accordingly, conventional bias modules (108) identify the worst-case power requirements of a coupled line driver to identify the bias voltage with which to drive the class A amplifier. In contradistinction to such conventional bias modules, the adaptive bias module 302 of the present invention utilizes a transconductor 424, and adjusts the bias of the transconductor to limit the output stage current $I_{COMM}$ to only that which is currently needed by the transmit driver 308. In certain implementations, introduction of the adaptive bias module 302 incorporating the teachings of the present invention reduce the power consumption of a host device, e.g., a 100 base-T network interface device, by thirty percent (30%).

As depicted within FIG. 4, control logic 404 receives one or more control signals 304 to control certain operational aspects of bias block 406. As used herein, control logic 404 is intended to represent any of a wide variety of control logic known to those skilled in the art including, but not limited to, a processor, microcontroller, programmable logic array (PLA), an application specific integrated circuit (ASIC), special-purpose microcontroller, and the like. In an alternate implementation, control logic 404 is intended to represent a plurality of executable instructions which, when executed by a host, implement the functions described herein.

In accordance with the illustrated example implementation, control logic 404 receives at least three signals 304 including a sensitivity signal, a pair selection signal (pair), and an enable signal. According to one implementation, introduced above, control logic 404 controls the sensitivity of the adaptive bias module 302 to fluctuations in the power requirements of the transmit driver 308 in response to the sensitivity signal received from an external source, e.g., a transceiver controller, etc. In accordance with such an embodiment, control logic 404 controls the sensitivity of the adaptive bias module 302 by instructing bias block 406 to adjust $I_{REF}$ 416. As discussed above, the current level of $I_{REF}$ 416 determines the nbiasp level at which the transistor driver 412 becomes starved of current. That is, when the current in the transistor 412 drops below $I_{REF}$ 416, diode 418 turns "on", which serves to supplement the voltage level applied to the transconductance cell 408 supplied by bias block 406 via line 426. According to one implementation, the sensitivity input is a two-bit input providing for four (4) different $I_{REF}$ levels such as, for example, 37.5 μA, 50 μA, 62.5 μA and 350 μA, respectively.

In addition to the sensitivity control input, control logic 404 also receives a pair selection input, and an enable signal. In accordance with one implementation, adaptive bias module 302 is implemented within a 100 base-T transceiver, wherein control logic 402 is employed to control certain operational aspects (e.g., reference current) or to enable/disable multiple threshold detectors. In such an implementation, the pair signal identifies which of the multiple threshold detectors the reference signals 304 are to be applied. According to one implementation, the enable signal is employed to enable/disable one or more elements of the adaptive bias module 302.

As introduced above, bias block 406 supplies a reference (bias) voltage to transconductance cell 408 based, at least in part, on control signals received from control logic 404. In addition, bias block 406 dynamically generates a reference current, 416, which determines how sensitive the adaptive bias module 302 is to fluctuations in the power demands of a coupled transmit driver. Accordingly, as used herein, bias block 406 is intended to represent any of a number of circuits, analog or digital, which perform the functions described herein.

Example Operation and Implementation

Having introduced the functional and architectural elements of the present invention with reference to FIGS. 3 and 4, associated methods of adaptive bias module operation will be developed below with reference to FIGS. 5–7. For ease of illustration, and not limitation, the development of such alternate embodiments will be made with continued reference to the system and architectural detail of FIGS. 3 and 4.

Figure 5:
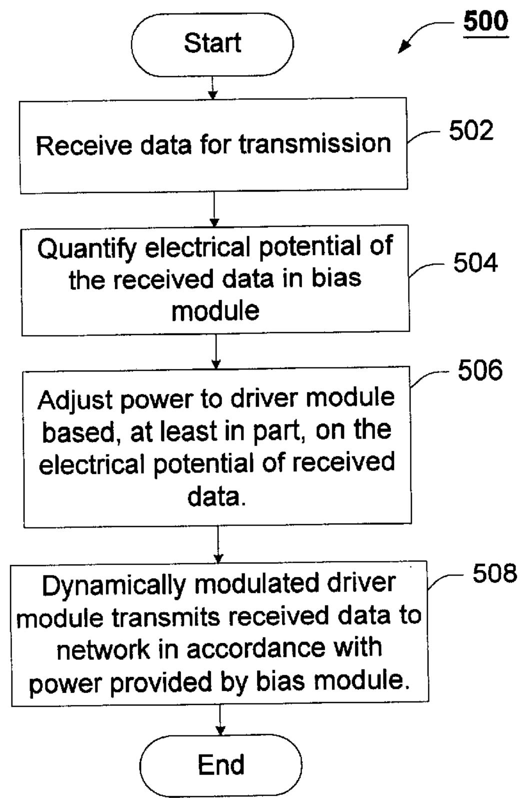
FIG. 5 is a flowchart of an example method for controlling a line driver within a network interface device, in accordance with one embodiment of the present invention.

FIG. 5 is a flowchart of an example method 500 for controlling a transmit driver, in accordance with the teachings of the present invention. In accordance with the illustrated example embodiment of FIG. 5, the method 500 begins with block 502 wherein the transmit driver 308 receives data for transmission. As transmit driver 308 begins transmitting the received data, an indication of the power requirements associated with such transmission is supplied to the adaptive bias module 302. In accordance with the illustrated example implementation of FIG. 3, the transmit driver 308 is coupled to the adaptive bias module 302 with a feedback path 310, which provides a bias level indication, nbiasp, from the core of the transmit driver 308. That is, adaptive bias module 302 receives an indication of the power requirements associated with transmitting a particular data set without actually sampling, or analyzing, the data content. Rather, nbiasp is an indication of the power level associated with transmitting a particular data set.

In block 504, upon receiving an indication of the power requirements associated with transmission of a received set of data, adaptive bias module quantifies the electrical potential of the received data. More particularly, as discussed above, nbiasp is applied to threshold detector 402 of adaptive bias module 302, which determines whether the received indication (nbiasp) exceeds a particular threshold defined, at least in part, by $I_{REF}$ 416.

In block 506, adaptive bias module 302 adjusts the power supplied to a transconductance cell 408 driver based, at least in part, on the power requirements associated with the data received for transmission. More particularly, based at least in part on a relative electrical potential of the received data set, reflected in the nbiasp indication, the bias level of the transcoductance cell 408 is adjusted which results in a corresponding adjustment in the common mode current $I_{COMM}$ delivered to the transmit driver 308 via line 306.

In block 508, transmit driver 308 transmits the received data to the coupled load (e.g., a data line, an air-interface, etc.) at a power level particularly enabled by adaptive bias module 302. That is, unlike conventional bias modules 110 which utilize a class A amplifier to provide a constant bias level designed for worst-case transmission conditions, the adaptive bias module 302 dynamically adjusts the bias level based, at least in part, on the power requirements associated with the data to be transmitted. An example method of dynamically adjusting the bias level is presented more fully with reference to FIG. 6, below.

Figure 6:
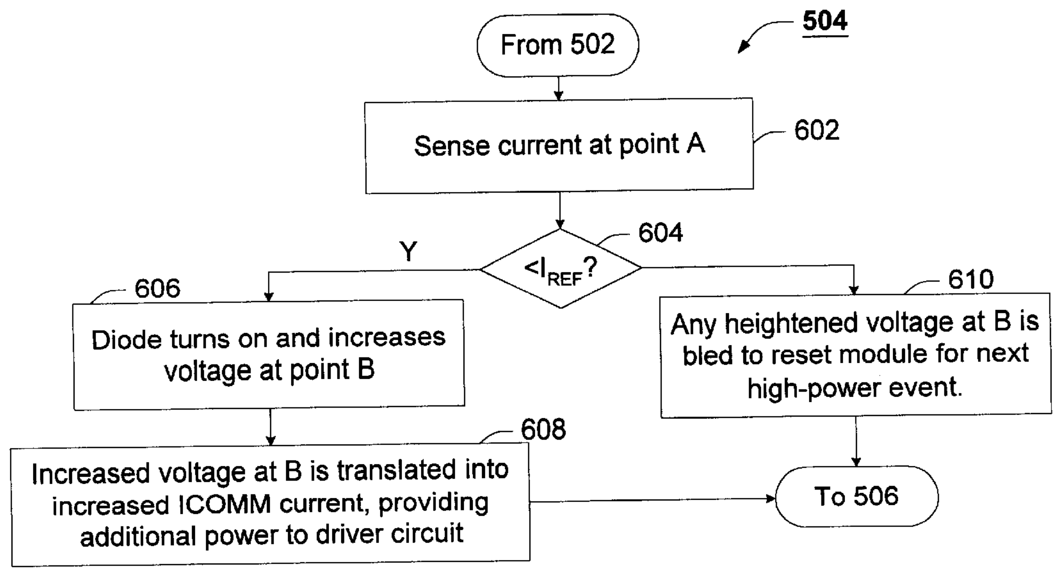
FIG. 6 is a flow chart of an example method of detecting a high-power event within a network interface device, in accordance with one aspect of the present invention.

Turing to FIG. 6, a flow chart of an example method 504 of dynamically adjusting the bias level to meet the transmission power requirements of received data is presented, in accordance with one example embodiment of the present invention. In accordance with the illustrated example implementation of FIG. 6, the method begins with block 602, wherein threshold detector 402 senses the current at point A (reference numeral 414). More particularly, as described above, threshold detector 402 identifies when a transistor driver 412 is starved of current when it slips below $I_{REF}$ 416, block 604.

When the transistor driver 412 is starved of current, diode 418 of the envelope detector is enabled, increasing the voltage at point B (422) by an amount reflective of the degree to which the current across the transistor driver 412 drops below the reference current, 416.

In block 608, the increased voltage at point B (422) is translated across the transconductor 424 to an increased current, $I_{COMM}$, driving the transmit driver 308 via line 306. More particularly, as introduced above, the increased voltage is a combination of voltage supplied by the transistor driver 412 through diode 418 to the transconductance cell 408 and added to the bias voltage applied by the bias block 406 to the transconductance cell 408.

Returning to block 604, if the current across transistor driver 412 is greater than or exceeds the reference current, $I_{REF}$ 416, the diode 418 is not enabled, and any excess voltage resident at point B (422) (e.g., from a prior high-power event) is bled through line 426 to reset the bias module 302 to supporting transmission at a lower power level.

Figure 7:
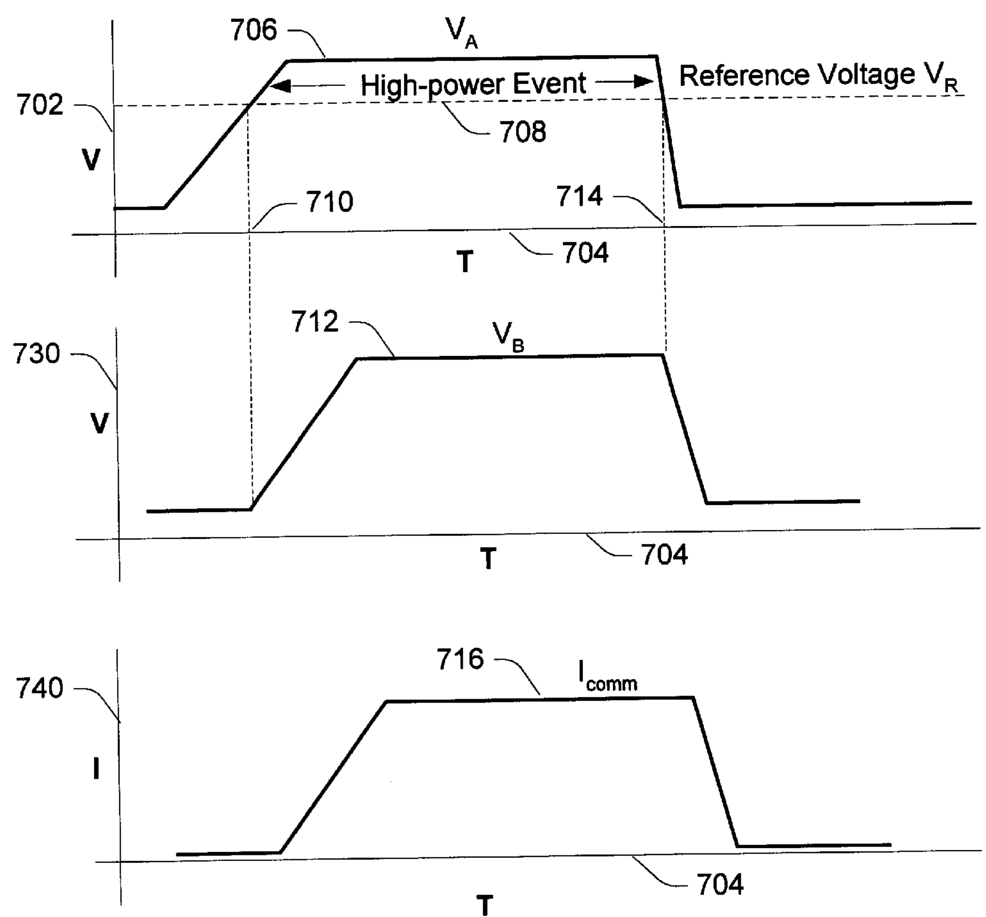
FIG. 7 is a graphical illustration of the relationship between the envelope detector input output and the resultant common mode current generated by the adaptive bias module, in accordance with the teachings of the present invention.

FIG. 7 provides a graphical illustration of the relationship between the threshold detector input, output and the common mode output current $I_{COMM}$ of adaptive bias module 302, in accordance with the teachings of the present invention. As depicted, FIG. 7 illustrates three coordinated graphs 702, 730 and 740, depicting the change in voltages (706, 712) and current (716) over time 704 in response to a change in the transmission power requirements in a coupled transmit driver (e.g., 308). In accordance with the illustrated example, as the voltage level 706 at point A (414 of FIG. 4) increases beyond a threshold, 710, the diode 418 is enabled to provide a corresponding supplemental voltage 712 to the input of the transconductance cell 408. In response, the common mode output current, $I_{COMM}$ 716 is increased to provide increased power to the transmit driver 308 to support transmission of data through the high-power event.

Alternate Embodiments

Figure 8:
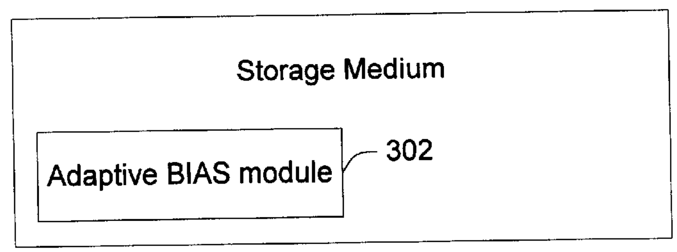
FIG. 8 graphically illustrates an example storage medium comprising a plurality of instructions which, when executed, cause an executing machine to implement the teachings of the present invention in accordance with yet another embodiment of the present invention.

FIG. 8 is a block diagram of a storage medium having stored thereon a plurality of instructions including instructions which, when executed, facilitate an implementation of adaptive bias module 302, according to yet another embodiment of the present invention. In general, FIG. 8 illustrates a storage medium/device 800 having stored thereon a plurality of machine-executable instructions including at least a subset of which that, when executed, implement the innovative adaptive bias module 302 of the present invention.

As used herein, storage medium 800 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, extensible Markup Language (XML), and the like. In one embodiment, the executable instructions are Very High Speed Integration Hardware Description Language (VHDL) instructions, which describe to a manufacturing device how to implement the invention in an integrated circuit. Moreover, it is to be appreciated that the storage medium/device 800 need not be co-located with any host system. That is, storage medium/device 800 may well reside within a remote server communicatively coupled to and accessible by an executing system. Accordingly, the software implementation of FIG. 8 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

In accordance with the foregoing, we claim the following:

What is claimed is:

1. A method comprising:

detecting a power level associated with data received by a transmit driver for transmission without analyzing data content by receiving an indication from the transmit driver denoting an electrical potential of the received data; and adapting a cumulative bias level applied to the transmit driver to facilitate transmission of the received data based, at least in part, on the detected power level by determining whether the received indication denotes a high-power event, and increasing the cumulative bias level applied to the transmit driver to facilitate transmission of the data associated with the high-power event by supplementing a static bias level with a dynamic bias level selected in accordance with the indication received from the transmit driver.

2. A method according to claim 1, wherein the high-power event is a baseline wander event.

3. A method according to claim 1, wherein determining whether the received indication denotes a high-power event comprises:

comparing the electrical potential associated with the received indication against a reference potential.

4. A method according to claim 1, wherein the dynamic bias level is applied only as needed to facilitate transmission through a high-power event.

5. A machine accessible storage medium comprising a plurality of executable instructions which, when executed, cause the machine to implement a method according to claim 1.

6. An apparatus comprising:

a transmit driver, to provide an indication of power associated with transmission of a received set of data without analyzing content of the data; and an adaptive bias module, coupled to the transmit driver, to adjust a bias level applied to the transmit driver to facilitate transmission of the received set of data based, at least in part, on the received indication, the adaptive bias module having a transconductance cell, to receive a bias voltage and transform it into an output current to drive the transmit driver and facilitate transmission of the received set of data and a threshold detector, coupled to the transconductance cell, to receive the indication from the transmit driver and detect when the indication has reached a threshold, whereupon the threshold detector provides a supplemental voltage to the transconductance cell to increase the output current, wherein the transconductance cell comprises a class A amplifier which, upon receiving the supplemental voltage from the threshold detector, deviates from its class A definition to temporarily provide an increased output current.

7. An apparatus comprising:

a transmit driver, to provide an indication of power associated with transmission of a received set of data without analyzing content of the data; and an adaptive bias module, coupled to the transmit driver, to adjust a bias level applied to the transmit driver to facilitate transmission of the received set of data based, at least in part, on the received indication, the adaptive bias module having a transconductance cell, to receive a bias voltage and transform it into an output current to drive the transmit driver and facilitate transmission of the received set of data and a threshold detector, coupled to the transconductance cell, to receive the indication from the transmit driver and detect when the indication has reached a threshold, whereupon the threshold detector provides a supplemental voltage to the transconductance cell to increase the output current, the threshold detector comprising:

a reference current source, to control a sensitivity of the threshold detector;

a transistor driver having a source and a gate, coupled via the source to the reference current source and to the transmit driver via the gate; and a diode, coupled to each of the current source and the transistor driver at the source of the transistor driver.

8. An apparatus according to claim 7, wherein the transistor driver receives the indication from the transmit driver via its gate and, when the indication denotes a high-power transmission event within the transmit driver, causes the transistor driver to become current starved, increasing a voltage input to the diode until, upon reaching a threshold, the supplemental voltage is passed from an output of the diode to the transconductance cell.

9. An apparatus comprising:

a transmit driver, to provide an indication of power associated with transmission of a received set of data without analyzing content of the data itself;

an adaptive bias module, coupled to the transmit driver, to adjust a bias level applied to the transmit driver to facilitate transmission of the received data based, at least in part, on the received indication;

a bias block, coupled to a transconductance cell and a threshold detector, to provide the transconductance cell with the bias voltage, and to provide the threshold detector with a reference current source; and a control module, coupled to the bias block, to control the amplitude of the reference current generated by the bias block based, at least in part, on a received sensitivity control signal.

10. An apparatus according to claim 9, wherein the reference current generated is one of 37.5 $\mu$A, 50 $\mu$A, 62.5 $\mu$A and 350 $\mu$A.

* * * * *